May 30, 1961  R. D. SPENCER  2,986,033
ANGLE OF ATTACK INSTRUMENTATION FOR AIRCRAFT
Filed Jan. 31, 1955  3 Sheets-Sheet 1

INVENTOR.
ROBERT D. SPENCER
BY Benj. T. Rauber
ATTORNEY

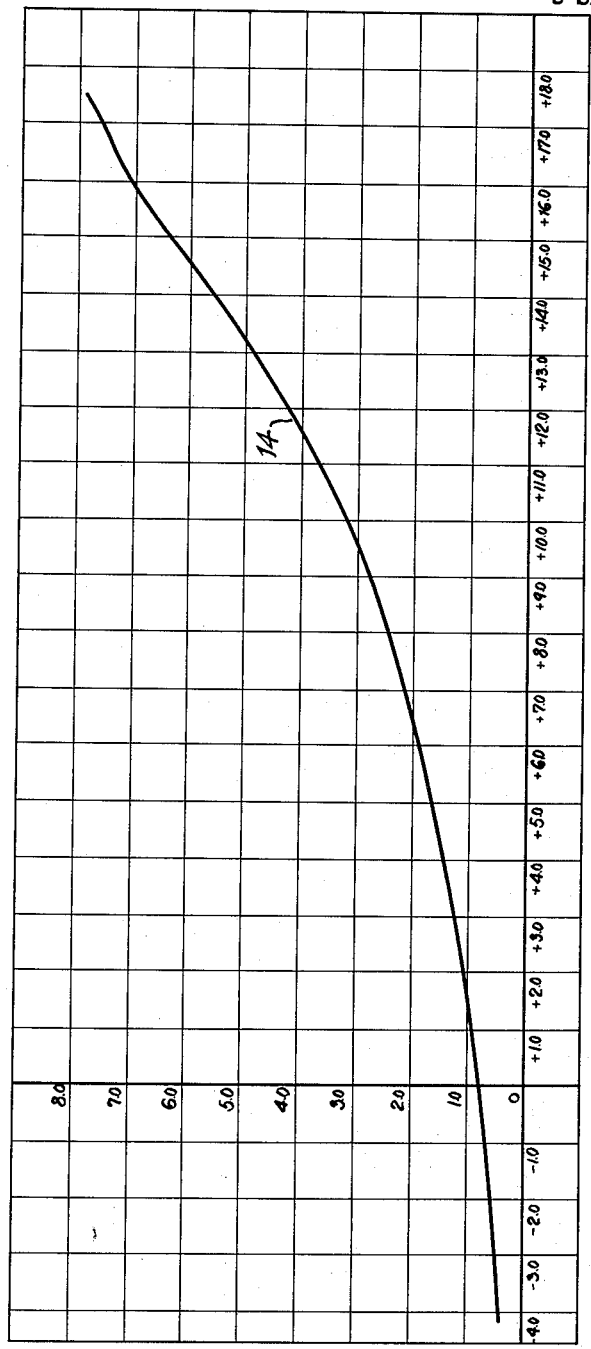

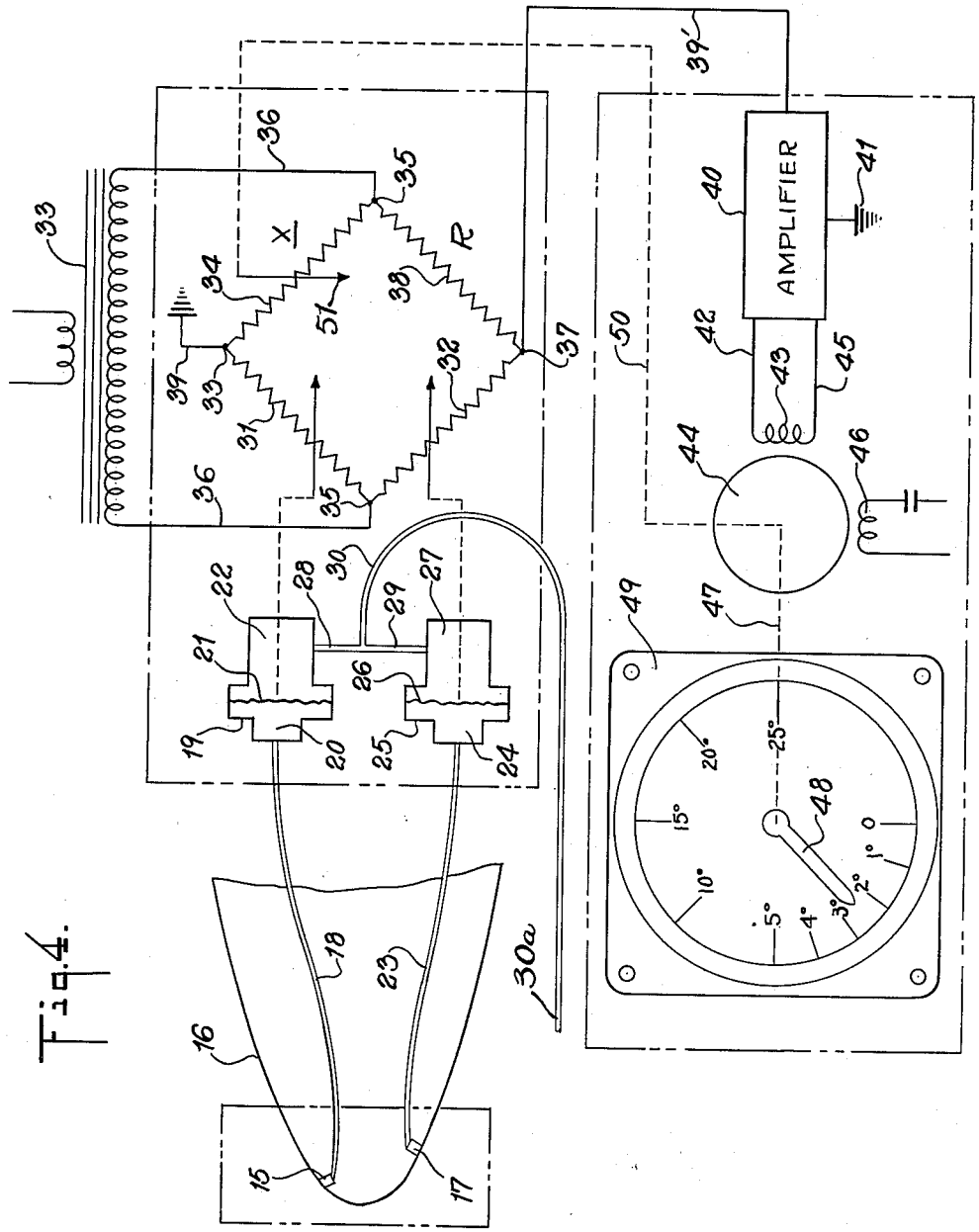

United States Patent Office 2,986,033
Patented May 30, 1961

2,986,033

ANGLE OF ATTACK INSTRUMENTATION FOR AIRCRAFT

Robert D. Spencer, Hartsdale, N.Y., assignor to Aerotec Industries, Inc., a corporation of Connecticut Filed Jan. 31, 1955, Ser. No. 485,030

14 Claims. (Cl. 73—180)

My invention relates to an aircraft wing lift instrumentation system, particularly for continuously indicating the angle of attack, the wing lift coefficient and the aircraft stalling speed, regardless of other parameters. It may also be used to indicate the angle of yaw. The instruments or instrumentation may continuously indicate also the percent of the maximum wing lift coefficient and the projected stalling speed which may be concerned. It may be used also for wind tunnel instrumentation to indicate directly the actual angle of attack developed by flow conditions being experienced in the wind tunnel.

These various data are dependent upon the angle of attack from which the instrument may be calibrated to give the other data.

This application is for an improvement of the invention of application Ser. No. 443,874, filed July 16, 1954 for Aircraft Instrumentation.

As explained in said co-pending application, whenever there is movement of an airfoil, namely an aircraft wing or wing section relative to a mass of air either by movement of the airfoil through the air or by passage of a stream of air past a stationary airfoil, as in a wind tunnel, the air divides, part of it passing over the upper surface of the airfoil and part of it below the under surface thereof. The point at which the air stream divides, one part to flow over the upper surface and the other beneath the under surface, is the point of zero flow, known as the "stagnation" point. It is the point of highest pressure, equalling the free stream dynamic pressure that is generated by the air flow against a relatively fixed point or locus.

The airfoil may be a wing or section of a wing, a separate element shaped like, and in fixed position relative to the wing or to the aircraft, or such an element shaped to divide the air stream vertically or horizontally to create different pressures that vary with, and are a function of, the direction at which the leading portion of the element meets the air either in flight or in a wind tunnel.

As further explained in said co-pending application, the flow of air about the airfoil is dependent to some extent upon the inclination of the chord of the airfoil to the direction of flow of the air relative thereto. The angle of the direction of flow of the air relative to the chord of the airfoil is known as the "angle of attack," whether the airfoil is stationary in a moving stream of air or whether it is moving in a relatively stationary mass of air. This angle of attack determines the point on the leading edge of the airfoil at which the air stream divides.

As the divided streams of air flow over the airfoil they create areas of pressure and vacuum, that is, areas in contact with the airfoil surface in which the air pressure is respectively above or below the free stream or atmospheric air pressure. The point or points between the superstatic pressure and the vacuum or substatic pressure, that is, the point where the pressure changes from superstatic to substatic or vice-versa is a point of "zero" pressure, that is, a point where the pressure equals the static or free stream pressure of the atmosphere. The positions of these pressure and vacuum areas and their magnitudes are determined by the angle of attack, the magnitudes of super or sub static pressures also being a function of the speed of the air relative to the airfoil. The combined effect of a vacuum or substatic pressure above the airfoil and the superstatic pressure below the airfoil determines the lifting effect of the air stream on the airfoil, wing or wing section. The lifting effect depends upon the area or design of the wing or airfoil, the speed of the aircraft relative to the air and a factor known as the "coefficient of lift" ($C_L$). This coefficient is determined by the angle of attack.

In level flight the angle of attack, and accordingly the coefficient of lift are small, the speed being high. In take-off and in landing however when the speed is relatively low the coefficient of lift and the angle of attack are increased to give the required lift. The coefficient of lift increases to a maximum with the angle of attack until a critical angle of attack is reached, generally below about 25°. Above this angle the lift coefficient decreases. The coefficient of lift at this critical angle is called the "maximum coefficient lift" ($C_L$ max). At the maximum of lift, or beyond it, the lift of the wings fails to equal the weight of the aircraft and the pilot loses control, regardless of the relative speed of the aircraft and of the density of the air. If this occurs sufficiently near the ground that the pilot cannot regain control, it results in a crash with dangerous and destructive results. At any altitude it is an undesirable situation.

The invention of the co-pending application provides an instrumentation which informs the pilot of the angle of attack, of the coefficient of lift and the relation of the lift coefficient to the maximum coefficient of lift, thus informing him of the angle of attack or of the margin between the coefficient of lift at any time and the maximum at which stall will occur.

In said co-pending application the angle of attack and the other data determined thereby was determined and measured by determining the total pressure at points on the airfoil spaced in the direction of flow, preferably one in the upper surface and one in the lower surface above the static atmosphere or free stream pressure, and then determining and indicating the ratio or proportion of these pressure determinations in terms of angle of attack or other characteristics.

The ratio between these pressures is a function of angle of attack and thus is independent of the speed and density of the air. The measurement of these ratios is determined by suitable indicating and calibrated elements.

With zero or small angles of attack there are two zero points on the airfoil, one above and one below the stagnation point and these are points at which pressures were to be taken in accordance with said application for instrumentation.

Electric measuring and indicating mechanism for indicating the ratio of pressures at these points over the free stream or atmospheric pressures gives only positive or arithmetic values at either side of an electrical or zero axis serving as a reference axis. An electric phase-detector was therefore required to indicate positive and negative angles of attack. Moreover in measuring the total pressure of the static or free stream atmospheric pressure an error might be introduced because this static pressure at any given altitude might vary in different parts of the aircraft or under different conditions of travel.

In my present invention these disadvantages are obviated and the necessity of obtaining free stream static pressure in angle of attack is eliminated. Also in my present invention an improved ratio curve is obtained as a function of angle of attack, precluding the possibility of introducing a "flat-spot" on the curve during small angles of attack. The electrical zero reference axis is also rendered unnecessary or eliminated, thus eliminating the requirement of a phase-detector, greater precision and determination of the angle of attack for a given set of parameters being obtained.

The improvements of my invention are obtained by utilizing the relation between the local pressure at chordwise spaced points on the airfoil or wing and the impact pressure or free stream dynamic pressure. This relationship and its utilization will be apparent from the following:

The static pressure at any point on the airfoil or wing will be different from the free stream static pressure, which is the barometric pressure at the altitude of the airfoil or wing when the barometric pressure is measured by an instrument having no motion relative to the air. This difference will be caused by the effect of the air stream at the selected point. The effect of the air stream depends on its velocity, the shape of the airfoil and the angle of attack and may be represented generally as follows:

(1) $\quad P_1 = P_s + f_1(\tfrac{1}{2}\rho V^2)$ where $P_1$ is the static pressure at the point selected, for example, on the upper surface of the airfoil or wing, $P_s$ is the free stream static pressure (the barometric pressure at the altitude of the wing or airfoil), $f_1$ is a function of the airfoil or wing shape and the angle of attack, $\rho$ is the density of the air at the altitude of the airfoil or wing and V is the velocity of the wing or airfoil relative to the air. As the shape of the airfoil does not change, $f_1$, for any specific airfoil or wing will vary with the angle of attack. Similarly for another point, for example on the under surface of the airfoil or wing:

(2) $\quad P_2 = P_s + f_2(\tfrac{1}{2}\rho V^2)$

The impact pressure, which is the pressure at the stagnation point of the airfoil is (3) $\quad P_t = P_s + \tfrac{1}{2}\rho V^2$ It is the pressure taken by an orifice in the direct line of the air and in which the full dynamic pressure $\tfrac{1}{2}\rho V^2$ is changed to static pressure and added to the free stream static pressure $P_s$ and is the maximum pressure that may be obtained. The static pressures at points $P_1$, $P_2$ etc., cannot exceed the impact pressure and are generally less than the impact pressure. The pressures $P_1$, $P_2$ etc., may be more or less than $P_s$ depending on the angle of attack. The increase or decrease $\Delta P_1$, $\Delta P_2$, etc., for selected points over the free stream static pressure, for any specific airfoil or wing equal to $f_1(\tfrac{1}{2}\rho V^2)$, $f_2(\tfrac{1}{2}\rho V^2)$, etc., and therefore a function of the angle of attack and velocity. $\Delta P_t$ is the function $\tfrac{1}{2}\rho V^2$, $f_2$ being unity.

In my invention the static pressure $P_1$ of a point on the upper surface of the airfoil or wing is balanced, by means of a diaphragm, against the impact pressure $P_t$ and the resultant pressure $P_u$ is transmitted by a transducer to an electric system. Similarly the static pressure $P_2$ at a point on the lower surface of the wing or airfoil is balanced by means of a diaphragm against the impact pressure and the resultant pressure $P_L$ is transmitted by a transducer to the electric system. The electric system measures the ratio of $P_u$ to $P_L$ and records this proportion for each angle of attack.

It is therefore apparent that (4) $\quad P_u = P_1 - P_t$ and (5) $\quad P_L = P_2 - P_t$ Substituting the values for these quantities given in Equations 1, 2 and 3, (6) $\quad P_u = [P_s + f_1(\tfrac{1}{2}\rho V^2)] - [P_s + \tfrac{1}{2}\rho V^2]$ and, simplifying this equation (7) $\quad P_u = P_s + f_1(\tfrac{1}{2}\rho V^2) - P_s - \tfrac{1}{2}\rho V^2$ $P_s$ cancels and the equation becomes (8) $\quad P_u = f_1(\tfrac{1}{2}\rho V^2) - \tfrac{1}{2}\rho V^2$ or (9) $\quad P_u = \tfrac{1}{2}\rho V^2(f_1 - 1)$ Similarly,

(10) $\quad P_L = [P_s + f_2(\tfrac{1}{2}\rho V^2)] - [P_s + \tfrac{1}{2}\rho V^2]$ or

(11) $\quad P_L = P_s + f_2(\tfrac{1}{2}\rho V^2) - P_s - \tfrac{1}{2}\rho V^2$

(12) $\quad P_L = f_2(\tfrac{1}{2}\rho V^2) - \tfrac{1}{2}\rho V^2$ or

(13) $\quad P_L = \tfrac{1}{2}\rho V^2(f_2 - 1)$

The ratio of $P_u$ to $P_L$ as transmitted by the transducers to the electric system is therefore

(14) $\quad \dfrac{P_u}{P_L} = \dfrac{1/2\rho V^2(f_1 - 1)}{1/2\rho V^2(f_2 - 1)}$ $\tfrac{1}{2}\rho V^2$ cancel out and the equation becomes

(15) $\quad \dfrac{P_u}{P_L} = \dfrac{f_1 - 1}{f_2 - 1}$ or $\dfrac{P_u}{P_L} = \dfrac{1 - f_1}{1 - f_2}$ $f_1$ and $f_2$ may be represented by any other symbols such as $K_1$ and $K_2$.

It may be noted that Equation 15 is free of velocity and that the only variables are $f_1$ and $f_2$ and that they vary only with changes in the angle of attack. Accordingly the ratio of $P_u$ to $P_L$ as measured by the electric system varies only with the angle of attack and may be calibrated in terms of angle of attack.

The various features of the invention are illustrated by way of example in the accompanying drawings in which Fig. 1 is a graph of the pressure coefficients $P_u$ or $f_1 - 1$ and $P_1$ or $f_2 - 1$ as ordinate, and the angle of attack as abscissa for a typical airfoil or wing surface, the upper surface pressure $P_u$ being taken at a point at a distance from the leading edge equal to 5% of the length of the chord and the lower pressure $P_L$ being taken at a distance from the leading edge equal to 15% of the length of the chord;

Fig. 3 is a graph of the ratio $$\dfrac{1 - f_1}{1 - f_2}$$

as ordinate and the angle of attack as abscissa, and

Fig. 4 is a diagrammatic sketch of apparatus embodying the invention.

Figure 1:
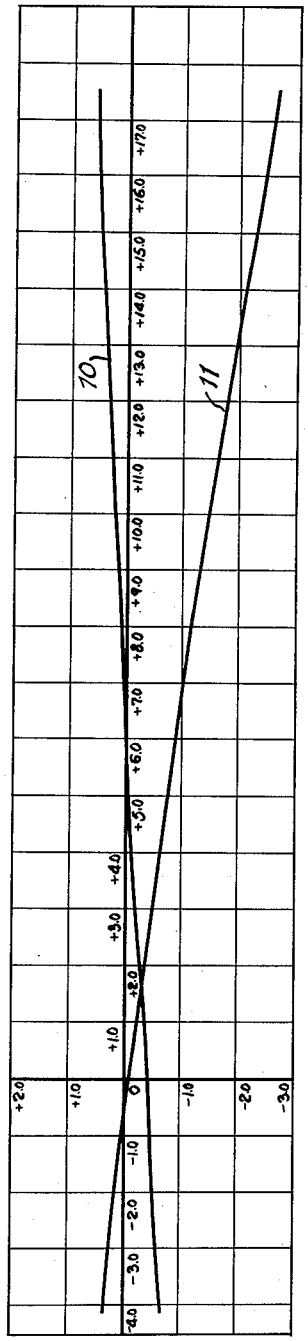

Referring to Fig. 1 the line 10 represents the pressure coefficient $P_u$ of the upper surface and the line 11 represents the pressure coefficient $P_L$ on the lower surface at the respective angles of attack and at the points at which these pressures were taken.

Figure 2:
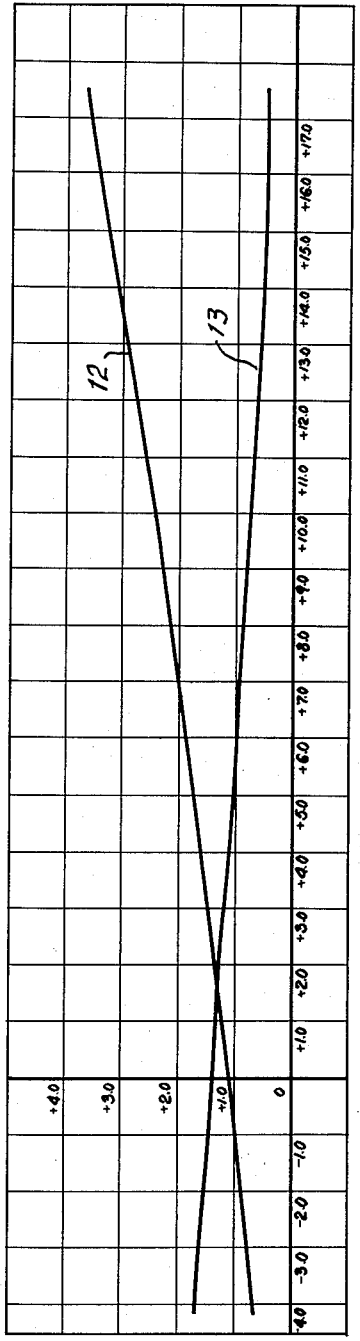
Fig. 2 is a graph of the values $1 - f_1$ and $1 - f_2$ as ordinates for the angle of attack as abscissa.

In Fig. 2 the line 12 is the value of $(1 - f_1)$ and the line 13 is the value of $(1 - f_2)$ at the various angles of attack.

In Fig. 3 the line 14 shows the ratio $$\dfrac{1 - f_1}{1 - f_2}$$

for the various angles of attack.

It will be noted from the above graphs that although the lines 10 and 11 cross, indicating a negative value at small angle of attack, the ratio $$\frac{(1-f_1)}{(1-f_2)}$$

is a smooth curve having a positive value at all angles of attack, both positive and negative.

Referring to Fig. 4 the invention is embodied in an apparatus having a pressure orifice 15 on the upper surface of the forward part 16 of an airfoil or wing, and an air pressure orifice 17 on the lower surface of the airfoil or wing, these orifices being, in the specific example illustrated, spaced aft of the leading edge of the airfoil.

From the orifice 15 a tube or duct 18 leads to a transducer 19 and enters a forward chamber 20 thereof which is separated by a diaphragm 21 from a rear chamber 22. Similarly the orifice 17 communicates through a tube or duct 23 to a chamber 24 of a second transducer 25 separated by a diaphragm 26 from a rear chamber 27 of the transducer. Both the chambers 22 and 27 communicate by branch conduits 28 and 29 respectively with a tube 30 which leads forwardly to form a Pitot tube 30a in position to receive the free stream dynamic pressure.

It will, therefore, be evident that one side of the diaphragm 21 is under the pressure $P_1$ at the upper part of the airfoil at the orifice 15, and the other side is under the free stream dynamic pressure $P_t$. One side of the other diaphragm 26 is similarly under the lower airfoil pressure $P_2$ and the other side under the free stream dynamic pressure $P_t$. The resulting pressure on the diaphragm 21 is, therefore, $P_1-P_t$ or $P_u$, and the resulting pressure on the lower diaphragm is equal to $P_2-P_t$ or $P_L$. The ratio $$\frac{P_u}{P_L}$$

is, therefore, equal to $$\frac{(f_1-1)}{(f_2-1)}$$

or, as the algebraic sign is of no consequence is equal to $$\frac{(1-f_1)}{(1-f_2)}$$

The diaphragms will be displaced proportionately to these values.

The displacements of the diaphragms of the transducers are imparted to two parallel branches 31 and 32 respectively of an electrical bridge circuit in such manner as to vary the resistance in these branches in accordance with the variations in the displacements of the diaphragms and accordingly with the values of the $(1-f_1)$ and $(1-f_2)$ respectively.

The electric potential for the bridge circuit is supplied from any suitable source as, for example, from a transformer 33, one terminal of the transformer being connected through a lead 36 to the junction 35 between the variable resistance branch circuits 31 and 32. The branch circuit 31 is connected at a junction point 33 to a variable resistance 34 which is in turn connected at a junction point 35 to a return lead 36 to the transformer. Similarly the end of the variable resistance 32 is joined at a junction point 37 to a fixed resistance 38 connected at the junction point 35 to the return lead 36. The junction 33 is grounded by a lead 39.

It will be apparent that if the resistances 31 and 32 are varied relative to each other, that the potential between the junctions 33 and 37 will vary accordingly. The junction 37 is connected by a lead wire 39' to an amplifier 40 and then to ground by a lead wire 41. When the junctions 33 and 37 are at equal potential no current will flow through the amplifier circuits 39, 41. If there is a difference in potential, current will flow through the amplifier. This will result in a current flowing from the amplifier through a lead wire 42 to a coil 43 of a motor 44 and then returning by a lead wire 45 to the amplifier. The motor 44 has a field or rotor coil 46 supplied from any suitable source. When current is supplied through the coil 43 the motor 44 rotates in accordance with the direction of the current, either forwardly or reversely. This rotation is transmitted through a mechanical connection 47 to the dial 48 of an indicator 49 which is graduated in terms of angle of attack. It may also be graduated in terms of other functions of the angle of attack, such as coefficient of lift, etc.

The rotation of the motor 44 is also transmitted through a mechanical connection indicated at 50 to a sliding contact 51 or other means for varying the resistance 34. Thus, when the potential between the junctions 33 and 37 is changed in one direction the motor 44 will be rotated in such manner as to restore equilibrium between the junctions 33 and 37, and this rotation will continue until equilibrium is restored and will move the pointer 48 a corresponding distance.

It will be apparent, therefore, that the pointer 48 indicates on the indicator a value corresponding to the resistance or change in resistance 34, which in turn is proportional to the relation $$\frac{(1-f_1)}{(1-f_2)}$$

and thus a correct and precise indication of the angle of attack will be indicated.

The pressure orifices 15 and 17 may be located at any selected distance or spacing longitudinally of the chordwise axis of the airfoil. The optimum location for these orifices is near the limits of travel of the leading edge stagnation point with various changes in the angle of attack. Preferably the upper orifice is located just aft of the most rearward location of the leading edge stagnation at minimum angle of attack, and the lower orifice just aft of the most rearward location of the stagnation point at the stall angle of attack.

Through the above invention I have provided a means whereby the angle of attack may be determined and indicated accurately and smoothly and independently of the velocity of the air stream relative to the aircraft.

It will be understood that apparatus with the pressure orifices positioned for the purpose may be used to indicate the angle of yaw.

Having described my invention, what I claim is:

1. Apparatus for determining the angle of attack of an airfoil which comprises means for detecting the difference between the free stream dynamic pressure and the pressure at one point on the airfoil and the difference between the free stream dynamic pressure and the pressure at a second point on the airfoil spaced chordwise from the first point and means for determining and indicating the ratio of the said differences thus detected.

2. The apparatus of claim 1 in which said means for detecting said pressure differences each comprises a diaphragm subjected on one side to the pressure at its respective point and on its opposite side subjected to the free stream dynamic pressure of the air flow relative to the airfoil.

3. The apparatus of claim 2 in which said means for detecting said pressure differences comprises a Pitot tube positioned to receive the free stream dynamic pressure communicating with said opposite side of said diaphragm.

4. Apparatus for determining the angle of attack of an airfoil in relative movement to air which comprises a pair of independent diaphragms; a Pitot tube positioned to receive the impact pressure of the air on said airfoil and communicating with and transmitting said pressure to one side of each of said diaphragms; means for transmitting the developed pressure at a first point on the airfoil to the opposite side of a first of said diaphragms; means for transmitting the developed pressure at a second point of said airfoil spaced a distance chordwise from said first point to the opposite side of a second of said diaphragms; an electric bridge circuit having a first and a second branch in parallel, the first of said branches comprising a first and a second variable resistance in series, means actuated by movement of the first diaphragm to vary said first variable resistance, the second branch comprising in series a fixed resistance and a third variable resistance, means actuated by the movement of said second diaphragm to vary said third variable resistance, a bridging connection connected between the junction of said first and second variable resistances of said first branch and the junction of said third variable resistance and said fixed resistance in said second branch, said bridging circuit comprising a motor energized by difference in potential between said junctions; means actuated by said motor to vary said second variable resistance until said bridge circuit is balanced, and an indicator actuated by said motor.

5. The apparatus of claim 4 in which said bridge circuit comprises an amplifier to receive control current from said bridge circuit and a take-off current to said motor.

6. The apparatus of claim 4 in which said points on said airfoil are spaced, respectively aft of the limits of forward and rearward limits of travel of the stagnation points of said airfoil at zero and stalling angles of attack.

7. The apparatus of claim 6 in which said indicator is calibrated in terms of angle of attack.

8. Apparatus for indicating the angle of attack of an airfoil in relative movement to air which comprises a first transducer, means to apply to said first transducer in opposed directions the free stream dynamic pressure of said air on said airfoil and the developed pressure at a first point on said airfoil, said first transducer having an output which varies as the difference between said free stream dynamic pressure and the developed pressure at said first point a second transducer, means to apply to said second transducer in opposed directions the free stream dynamic pressure of said air on said airfoil and the developed pressure on said airfoil at a second point spaced from said first point chordwise of said airfoil, said second transducer having an output which varies as the difference between said free stream dynamic pressure and the developed pressure at said second point and means responsive to the outputs of said transducers to indicate the ratio of the differences of said opposed forces on said first and second transducers.

9. The apparatus of claim 8 in which said means to indicate said ratio indicates said ratio, as angle of attack.

10. The apparatus of claim 8 in which said means responsive to said transducers comprises an electric circuit comprising a pair of branched circuits one acted upon by said first transducer and the second by the second transducer to vary the resistances in said branched circuits in proportion to the actuation by said transducers and means to measure and to indicate the ratio of the resistances in said branched circuits.

11. Apparatus for determining the angle of attack of an airfoil which comprises a pair of independent diaphragms, a Pitot tube positioned to receive the free stream dynamic pressure of air flowing relative to said airfoil and communicating with one side of each diaphragm, the opposite side of each diaphragm being exposed to the developed pressure at a point on an airfoil spaced a distance chordwise of the point of exposure of the other diaphragm, each diaphragm moving an amount proportional to the resultant net pressure on its two sides, and means responsive to the movement of said diaphragms to establish an output proportional to the ratio of the net pressures on said diaphragms and to indicate this ratio.

12. The apparatus of claim 11 in which said means comprises an indicator calibrated in terms of the angle of attack of said airfoil.

13. The apparatus of claim 12 in which said means comprises an electrical bridge circuit whose components are controlled by the resulting net pressures on said diaphragms and in which said indicator is responsive to the output potential difference of said bridge circuit.

14. The apparatus of claim 13 in which said circuit comprises a motor having a rotor rotatable to vary the bridge circuit components to reduce said potential difference to zero and to actuate said indicator in proportion to its rotation.

References Cited in the file of this patent

UNITED STATES PATENTS

| 2,275,317 | Ryder | Mar. 3, 1942 |
| 2,390,534 | Henver | Dec. 11, 1945 |
| 2,512,278 | Jones | June 20, 1950 |
| 2,537,932 | Kliever | Jan. 9, 1951 |
| 2,624,529 | Greene | Jan. 6, 1953 |

FOREIGN PATENTS

| 963,574 | France | Jan. 4, 1950 |
| 685,292 | Great Britain | Dec. 31, 1952 |